Nov. 24, 1942.   H. J. ANDERSON   2,302,930

VALVE DIAPHRAGM

Filed Oct. 6, 1941

INVENTOR.
Harry J. Anderson
BY Edward H. Lang

Patented Nov. 24, 1942

2,302,930

UNITED STATES PATENT OFFICE 2,302,930

VALVE DIAPHRAGM

Harry J. Anderson, Chicago, Ill., assignor to Hills-McCanna Company, Chicago, Ill., a corporation of Illinois Application October 6,1941, Serial No. 413,759

1 Claim. (Cl. 251—24)

This invention relates to improvements in weir-type valve diaphragms.

Diaphragm-type valves are widely used commercially, in which the valve is closed by compressing a flexible diaphragm against a weir situated between the inlet and outlet of the valve. Such valves are generally made in two distinct parts, one being the body portion and the other being the bonnet portion. The diaphragm is clamped between the body and bonnet portions in the assembled valve and held in position by bolts passing through registered holes in flanges on the body and bonnet and in the diaphragm.

Where such valves are intended for use in connection with chemicals, it is common practice to make the body portion out of bronze, stainless steel, or other corrosion resistant alloy; or to make the body portion out of cast iron and line it with lead, rubber or glass. Since the bonnet and bolts do not come in contact with the chemical, they are made out of cheaper material such as cast iron or low grade steel in order to cut down the cost of the valve.

It has been discovered, however, that such valves do not always function entirely satisfactorily due to leakage between the weir and diaphragm when in closed position. Moreover, due to leakage of liquid from the body into the bonnet portion of the valve through the bolt holes in the diaphragm, electrolytic and chemical corrosion of the bolts and bonnet proceed rapidly, destroying those portions of the valve.

It has been found that the leakage can be substantially entirely eliminated by molding the diaphragm with beads on the lower side thereof, which beads engage the flange of the body portion to prevent leakage into the bonnet and also with a bead across the center of the lower face of the diaphragm which is adapted to engage the weir when in closed position.

Figure 1:
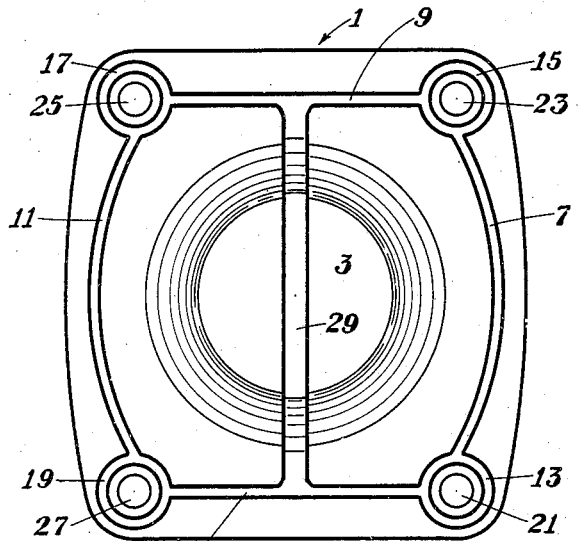
Figure 2:
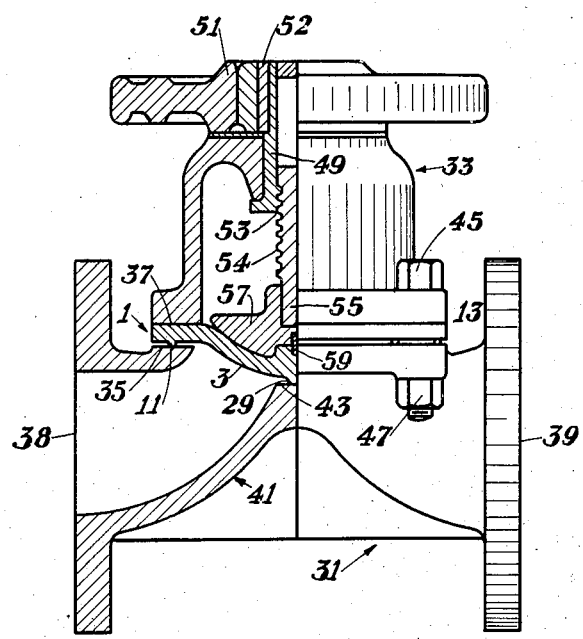

In order to more fully understand the invention, reference is had to the accompanying drawing of which Figure 1 is an enlarged plan view of a diaphragm made in accordance with the invention, looking at the bottom face of the diaphragm; and Figure 2 is an elevational view, partly in cross-section, of a valve containing the novel diaphragm.

Referring to the drawing, numeral 1 indicates a valve diaphragm which may be made of one or more layers of woven fabric covered with compounded, vulcanized, natural or synthetic rubber which is resistant to corrosion by chemicals. "Neoprene" is a satisfactory synthetic rubber or "Elastomer" for this purpose. The diaphragm is preferably formed with a central circular portion 3 upwardly bulged in order to permit the diaphragm to move into open and closed position without subjecting it to stretching and thereby permanently distorting and weakening it.

The lower face of the diaphragm is formed adjacent the edges thereof with the beads 5, 7, 9 and 11 which connect with the circular beads 13, 15, 17 and 19 which surround the holes 21, 23, 25 and 27, respectively, in the diaphragm. The beads 5, 7, 9, 11, 13, 15, 17 and 19 are molded as part of the diaphragm and form an integral part of the rubber coating on the lower face thereof. Another bead 29 is molded across the lower face of the diaphragm and extends as a straight line between the beads 5 and 9. By virtue of the fact that the beads are molded of compounded stock without having any fabric therein, the beads are more flexible than the main body portion of the diaphragm and therefore more amenable to distortion and compression when subjected to pressure.

The beads 5, 7, 9, 11, 13, 15, 17 and 19 are preferably of narrow width and stand out from the lower face of the diaphragm only a very small distance. It has been found that beads having a width of approximately $\frac{1}{16}$" and a depth of approximately $\frac{1}{32}$" satisfactorily prevent leakage of liquid between the diaphragm and metal surface against which the face of the diaphragm lies when in bolted position in the valve.

The bead 29 is preferably made somewhat wider than the other beads and also somewhat deeper. It has been found that a depth of approximately $\frac{1}{16}$" and a width of approximately $\frac{3}{16}$" is satisfactory. In order that the full benefit of bead 29 may be obtained, it should be narrower than the face of the weir upon which it is adapted to seat when the valve is in closed position. It is preferred to form bead 29 with a curved surface since by so doing, it has been found that the bead is more durable.

Referring more particularly to Figure 2, there is shown diagrammatically a commercial type valve having a body portion 31 and cylindrical shaped bonnet portion 33. The body is formed with flange 35 and the bonnet is formed with flange 37. The flanges are shaped to fit the contour of diaphragm 1. The body has an inlet 38 and an outlet 39 and is cast with an upstanding weir 41 between the inlet and outlet. The top face or seat 43 of the weir is a short distance below the face of the flange 35. The body has an opening in the top thereof surrounded by the flange 35. The bonnet has an opening in the bottom thereof surrounded by the flange 37. The diaphragm is held tightly in place between the flanges 35 and 37 by means of bolts 45 and nuts 47. Four such bolts and nuts are required to hold the assembled valve together, a bolt and nut being in the corner of the flanges registering with the holes in each corner of the diaphragm.

The upper portion of the bonnet contains a collar which is keyed to hand wheel 51 by means of key 52. The hand wheel and collar are adapted to rotate in the bonnet, always remaining in the same horizontal plane. The bottom of the inner face of the collar 49 is threaded as shown at 51 and is adapted to engage the threads 53 on stem 55. Rotation of the hand wheel causes the stem to move upwardly or downwardly in the collar, depending on the direction of rotation.

A compressor 57 is fastened to the lower end of the stem. The compressor has a diameter slightly less than that of the inside of the bonnet and the bottom face of the compressor 57 is curved to conform to the shape of that portion of the diaphragm which it contacts when the valve is in closed position. The compressor may or may not be fastened to the center of the diaphragm. As shown in Figure 2, the compressor is fastened to the diaphragm by means of a screw 59, the upper end of which screws into the lower face of the compressor and the head of which is buried between the faces of the diaphragm. Likewise, the compressor may be a solid body or made of a series of radial or spaced parallel fingers.

As shown, the beads 5, 7, 9, 11, 13, 15, 17 and 19 lie between the flanges 35 and 37 and when the parts of the valve are bolted tightly, the beads flatten out, effectively closing any small spaces that might otherwise exist and permit passage of liquid between the face of the flange 35 and the lower face of the diaphragm, and then up through holes 21, 23, 25 and 27.

As shown in Figure 2, when the diaphragm is in closed position the bead 29 is squeezed into any slight passageways that would otherwise exist, between the upper face 43 of the weir and the lower face of the diaphragm, thereby effectively preventing leakage.

I claim:

A flexible valve diaphragm having a plurality of spaced holes adjacent the edges thereof through which bolts are adapted to pass and a narrow continuous bead formed on one face of said diaphragm adjacent the edges thereof and surrounding said holes, and a wider bead, merging at its ends with said first mentioned bead, extending across the aforesaid face of said diaphragm along a line adapted to register with a weir in a valve in conjunction with which said diaphragm is to be used, said beads being more flexible than the main body portion of the diaphragm.

HARRY J. ANDERSON.